(12) United States Patent
Kizaki et al.

(10) Patent No.: US 8,613,985 B2
(45) Date of Patent: Dec. 24, 2013

(54) LIQUID CRYSTAL/POLYMER COMPOSITE

(75) Inventors: Yukio Kizaki, Kawasaki (JP); Hajime Yamaguchi, Kawasaki (JP); Yuko Kizu, Yokohama (JP); Masao Tanaka, Sagamihara (JP); Akiko Hirao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/557,703

(22) Filed: Jul. 25, 2012

(65) Prior Publication Data

US 2012/0307184 A1   Dec. 6, 2012

Related U.S. Application Data

(63) Continuation of application No. PCT/JP2010/000383, filed on Jan. 25, 2010.

(51) Int. Cl.
*C09K 19/38* (2006.01)
*C09K 19/54* (2006.01)
*C09K 19/20* (2006.01)
*G02F 1/1334* (2006.01)

(52) U.S. Cl.
USPC ............ 428/1.1; 252/299.5; 252/299.67; 349/88; 977/754; 977/897

(58) Field of Classification Search
CPC .. C09K 19/0275; C09K 19/38; C09K 19/586; C09K 2019/0418; B82Y 40/00
USPC ............ 252/299.5, 299.67; 349/88; 977/897, 977/754; 428/1.1
See application file for complete search history.

(56) References Cited

U.S. PATENT DOCUMENTS

2006/0227283 A1   10/2006   Ooi et al.
2008/0259254 A1   10/2008   Kikuchi et al.

FOREIGN PATENT DOCUMENTS

| EP | 0 881 541 A1 | 12/1998 |
| JP | 5-333544 | 12/1993 |
| JP | 2007-9070 | 1/2007 |
| JP | 2008-201682 | 9/2008 |
| WO | WO 2013026691 A1 * | 2/2013 |

OTHER PUBLICATIONS

International Search Report issued May 11, 2010 in PCT/JP2010/000383, filed Jan. 25, 2010.
Hao et al., "Dendrimers as Scaffolds for Multifunctionall Reversible Addition—Fragmentation Chain Transfer Agents: Syntheses and Polymerization" Journal of Polymer Science Part A Polymer Chemistry, vol. 42, No. 7, Apr. 2004, 5877-5890 (15 pages).
Malkoch et al., "Synthesis and Characterization of 2,2-Bis(methylol)propionic Acid Dendrimers with Different Cores and Terminal Groups" Journal of Polymer Science Part A Polymer Chemistry, vol. 42, No. 23, Dec. 2004, 1758-1767 (11 pages).
Combined Office Action and Search Report issued May 10, 2013 in Chinese Application No. 201080055820.0 (With English Translation).

* cited by examiner

*Primary Examiner* — Shean C Wu
(74) *Attorney, Agent, or Firm* — Oblon, Spivak, McClelland, Maier & Neustadt, L.L.P.

(57) ABSTRACT

According to one embodiment, a liquid crystal/polymer complex includes a liquid crystal material, a polymer, and a chiral agent. The liquid crystal material exhibits blue phase and contains liquid crystal molecules that are spirally arranged to form liquid crystal molecular cylinders having a spiral arrangement. The polymer maintains the arrangement and has a dendrimer-type structure including a dendrimer unit and a polymerizable unit bonded to an end of the dendrimer unit. The dendrimer unit contains a central atom and at least two branched structures bonded to the central atom and has a generation of two or more. The polymerizable unit contains a polymerizable group which can bond to a polymerizable group.

15 Claims, 5 Drawing Sheets

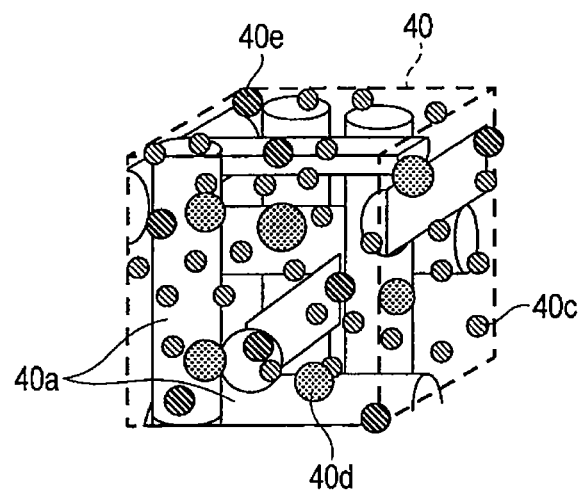
F I G. 2C
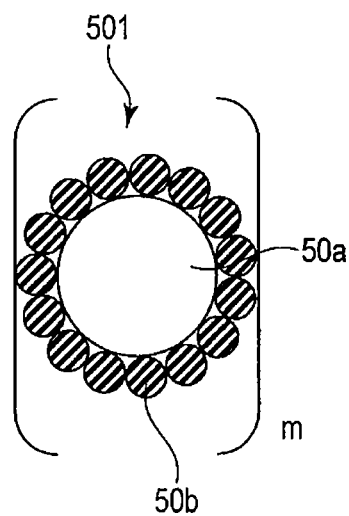
F I G. 3A

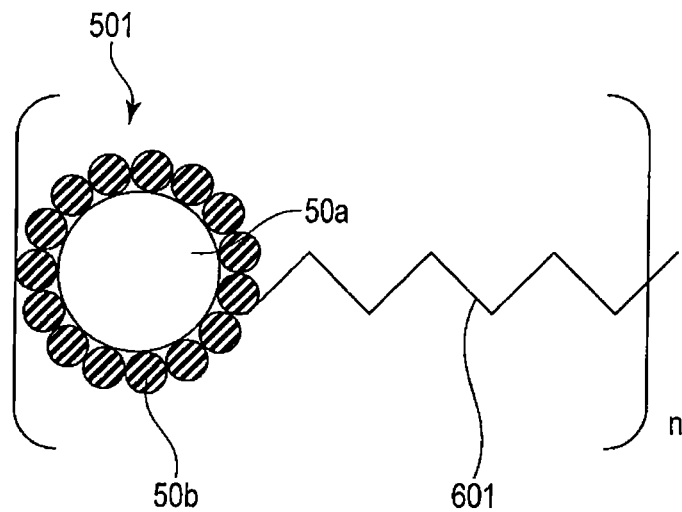
F I G. 3B
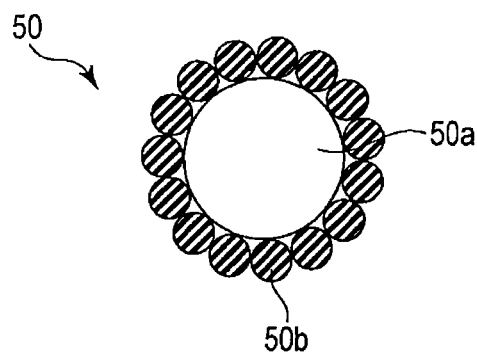
F I G. 4
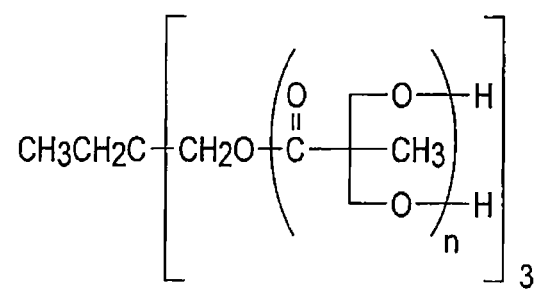
F I G. 5

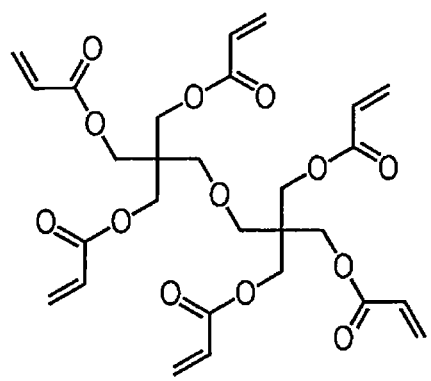
F I G. 6
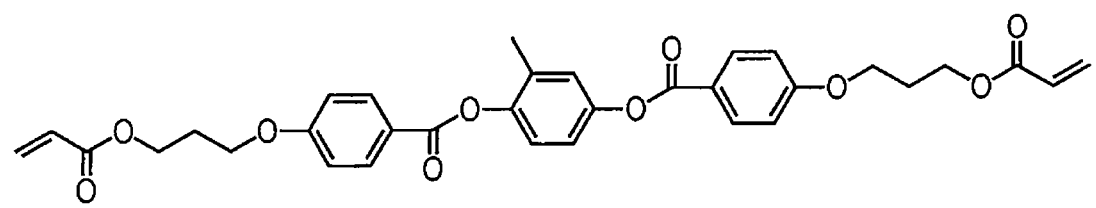
F I G. 7
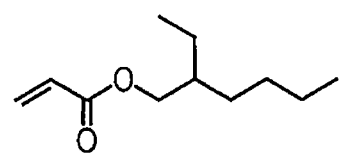
F I G. 8

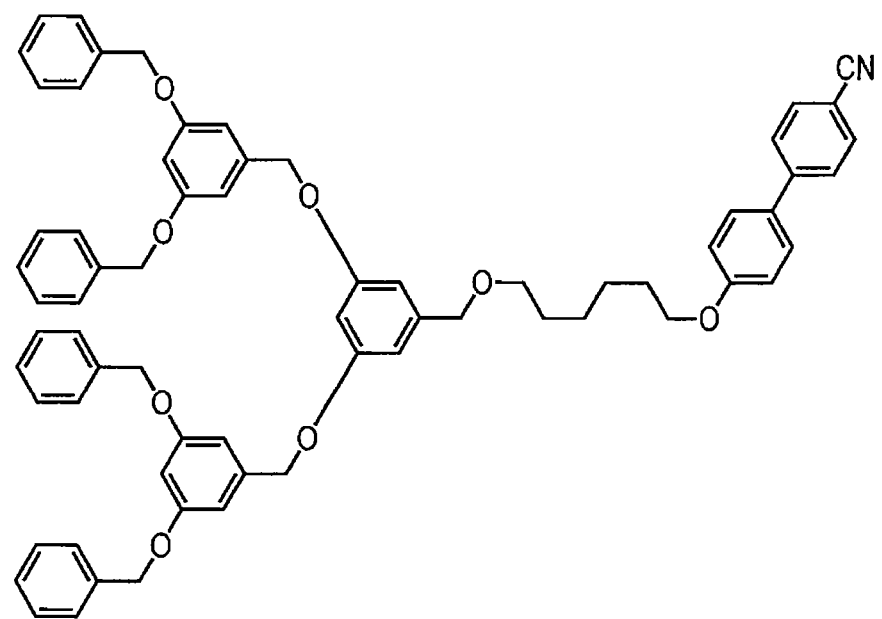
F I G. 9

LIQUID CRYSTAL/POLYMER COMPOSITE

CROSS REFERENCE TO RELATED APPLICATIONS

This application is a Continuation Application of PCT Application No. PCT/JP2010/000383, filed Jan. 25, 2010, the entire contents of which are incorporated herein by reference.

FIELD

Embodiments described herein relate generally to a liquid crystal/polymer composite, a liquid crystal display using the same, and a method of producing a liquid crystal/polymer composite.

BACKGROUND

When display modes such as an in-plane switching (IPS) mode, a vertically aligned (VA) mode, and an optically compensated bend (OCB) mode are employed for liquid crystal display, a fast response speed can be achieved. A liquid crystal display that uses a liquid crystal layer exhibiting the Kerr effect to achieve higher response speed is known. The Kerr effect is an effect by which the refractive index of a transparent isotropic medium exhibits anisotropy in proportion to the square of the external electric field. In the liquid crystal layer exhibiting the Kerr effect, since the correlation length (the influence degree of orientational order) of the liquid crystal molecule is short, the layer exhibits a high-speed electric field response of several milliseconds or less and provides a high response speed. A cholesteric blue phase (simply referred to as "blue phase"), smectic blue phase, and quasi-isotropic phase are known as liquid crystal layers exhibiting the Kerr effect.

JP-A 2008-201682 (KOKAI) discloses a liquid crystal display in which the temperature range of a liquid crystal material exhibiting a blue phase is 10.9° C. (temperature: about 12° C. to 23° C.) by adding dendrons to the liquid crystal material, and the range is extended as compared to when not adding dendrons. However, there is a need for a liquid crystal material exhibiting a blue phase in a wider temperature range in order to be put into practical use.

BRIEF DESCRIPTION OF THE DRAWINGS

FIG. 2C is a schematic diagram showing the liquid crystal layer before preparation of polymer;

FIG. 3A is a schematic diagram showing a polymer formed of a dendrimer-type monomer;

FIG. 3B is a schematic diagram showing a polymer formed of a dendrimer-type monomer and a linear monomer;

FIG. 4 is a schematic diagram showing a dendrimer-type monomer structure;

FIG. 5 shows one example of the dendrimer-type monomer structure;

FIG. 6 shows another example of the dendrimer-type monomer structure;

FIG. 7 shows a liquid crystalline monomer used in one example;

FIG. 8 shows a liquid crystalline monomer used in a Comparative example; and

FIG. 9 shows a dendrimer-type monomer used in a Comparative example.

DETAILED DESCRIPTION

Figure 1:
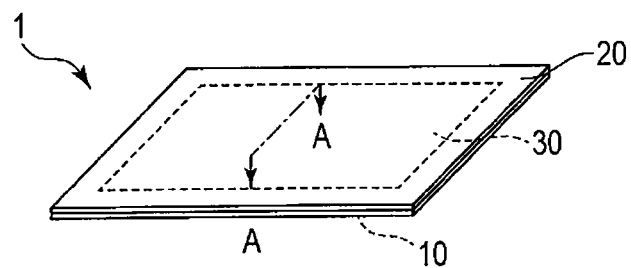
FIG. 1 is a schematic diagram showing a liquid crystal display according to one embodiment.

In general, according to one embodiment, a liquid crystal/polymer complex includes a liquid crystal material, a polymer, and a chiral agent. The liquid crystal material exhibits blue phase and contains liquid crystal molecules that are spirally arranged to form liquid crystal molecular cylinders having a spiral arrangement. The polymer maintains the arrangement and has a dendrimer-type structure including a dendrimer unit and a polymerizable unit bonded to an end of the dendrimer unit. The dendrimer unit contains a central atom and at least two branched structures bonded to the central atom and has a generation of two or more. The polymerizable unit contains a polymerizable group which can bond to a polymerizable group. The chiral agent controls an orientation of the liquid crystal molecules.

Hereinafter, embodiments will be described in detail with reference to the drawings. The same reference numerals denote common portions throughout all the drawings and an overlapped description is not repeated.

In embodiments, the liquid crystal material contained in the liquid crystal layer is not particularly limited as long as it exhibits a blue phase. Two or more types of liquid crystal materials may be used, and substances other than the liquid crystal materials may be contained in the liquid crystal layer. If liquid crystal materials such as a cholesteric liquid crystal or a chiral nematic liquid crystal (hereinafter collectively referred to as "cholesteric liquid crystal"), a mixture of a nematic liquid crystal and a cholesteric liquid crystal, and a mixture of a nematic liquid crystal and an optically active substance are set within a temperature range specific to the liquid crystal materials, the materials exhibit blue phases.

FIG. 1 is a schematic diagram of a liquid crystal display according to one embodiment. A liquid crystal display 1 comprises an array substrate 10 in which picture elements and wirings (not shown) are formed in array form, an opposed substrate 20 which is opposed to the array substrate 10 at a predetermined gap and has an opposed electrode, a liquid crystal layer 30 which is located between the array substrate 10 and the opposed substrate 20 and comprising a polymer and a liquid crystal material which exhibits a blue phase, a picture element electrode 105a formed on the array substrate 10, and an opposed electrode 105b formed on the opposed substrate 20 (shown in FIG. 2). A plurality of picture elements are formed on the array substrate 10. A voltage is supplied to each picture element from a drive circuit (not shown) via wirings.

The temperature range in which the liquid crystal material exhibits a blue phase varies depending on the liquid crystal material. When a voltage is applied to the liquid crystal material, birefringence or the optical retardation, i.e., the amount derived from birefringence, is proportional to the square of the applied voltage (Kerr effect). The fact that the liquid crystal material exhibits a blue phase can be confirmed from this Kerr effect.

As for the array substrate 10 and the opposed substrate 20, a substrate having sufficient strength, insulation properties, and transparency, such as glass is used. In addition, it is also possible to use plastics, ceramics, and the like.

Figure 2A:
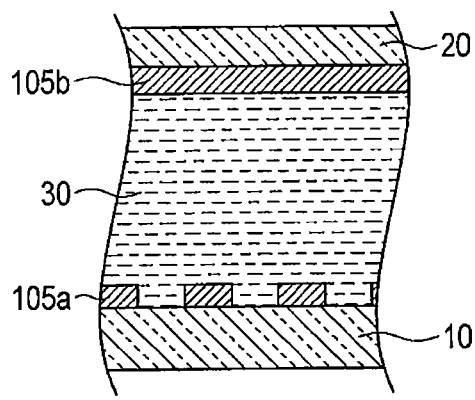
FIG. 2A is a cross-sectional view of the liquid crystal display according to one embodiment.

FIG. 2A is a cross-sectional view showing the liquid crystal display of FIG. 1 cut at a line AA. Pixel electrodes 105a corresponding to picture elements are disposed on a main surface at the side of a liquid crystal layer 30 of an array substrate 10. As a common electrode, the opposed electrode 105b is disposed on a main surface at the side of the liquid crystal layer 30 of an opposed substrate 20.

An insulating layer (not shown) is formed on the surface of the picture element electrode 105a. A spacer (not shown) is disposed between the array substrate 10 and the opposed substrate 20 so as to keep the distance between the array substrate 10 and the opposed substrate 20 more accurately at a predetermined gap.

Figure 2B:
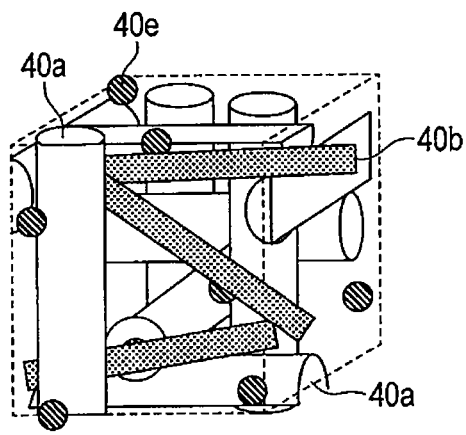
FIG. 2B is a partially enlarged view of the liquid crystal display according to one embodiment.

FIG. 2B is a partially enlarged view of the liquid crystal layer 30. As illustrated, a liquid crystal layer 30 contains a liquid crystal material 40a, a polymer 40b, and a chiral agent 40e. The polymer 40b is prepared by polymerizing precursors. Precursors 40d before polymerization are shown in FIG. 2C. Before polymerization, a precursor 40d and a polymerization initiator 40c exist in the layer in place of the polymer 40b. Precursors 40d are polymerized with the polymerization initiator 40c, thereby polymers 40b are prepared.

<Liquid Crystal Material>

In the liquid crystal material 40a, liquid crystal molecules are spirally arranged to form a cylinder.

Therefore, the liquid crystal material is referred to as a liquid crystal molecule cylinder. A lattice 40 is formed by a plurality of liquid crystal molecule cylinder 40a. When the liquid crystal molecule cylinders 40a are observed macroscopically, they are spirally disposed. Liquid crystal molecules are spirally arranged to form liquid crystal molecule cylinders 40a, and the liquid crystal molecule cylinders 40a are spirally disposed. This is the feature by which the liquid crystal layer exhibits a blue phase.

The precursor 40d, the polymerization initiator 40C, and the chirals agent 40e are located in the spaces among a plurality of the liquid crystal molecule cylinders 40a. The chiral agents 40e may control the orientation of the liquid crystal material.

<Polymer>

The polymer 40b can be obtained by polymerizing a dendrimer-type structure 501 as a repeating unit as shown in FIG. 3A. m is an integer which represents the repeating number of the repeating unit. Usually, m is about 2 to 20. The dendrimer-type structure 501 has a central atom such as carbon or oxygen, the central atom having two or more bonding hands. A skeleton structure of the dendrimer-type structure 501 is radially (dendritically) branched from the central atom. The number of branches from the central atom to the end of the radial skeleton (the outermost radial side) is referred to as a generation. In the dendrimer-type structure 501 used in the embodiments, the generation is 2 or more.

The dendrimer-type structure 501 is spherical as a whole and is comprised of a dendrimer unit 50a and polymerizable unit 50b covering the dendrimer unit 50a. The polymerizable unit can bond to polymerizable unit of other dendrimer-type structure. The molecular weight of the dendrimer-type structure 501 is preferably about 2000 or more.

Another example of the polymer 40b is shown in FIG. 3B. As illustrated, the polymer is not limited to one comprised of only the dendrimer-type structure 501 and it may contain a non-dendrimer-type structure 601. As the non-dendrimer structure 601, it is preferable to use a liquid crystalline structure or a non-liquid crystalline structure having a mesogenic group which interacts with the liquid crystal material. For example, a linear structure is listed. The mesogenic group helps to exhibit the liquid crystallinity of liquid crystal molecules. FIG. 3B shows a polymer having a repeating unit in which the dendrimer-type structure 501 and the non-dendrimer-type structure 601 are bonded at a ratio of 1:1. A polymerizable unit 50b of the dendrimer-type structure 501 bonds to the non-dendrimer-type structure 601. n is an integer which represents the repeating number of the repeating unit.

<Precursor>

The polymer 40b can be prepared by polymerizing the precursor 40d. As a precursor of a polymer 40b formed of only the dendrimer-type structure 501 shown in FIG. 3A, a dendrimer-type monomer 50 (FIG. 4) is used. The dendrimer-type monomer 50 has a central atom such as carbon, and a generation of two or more. The skeleton of the dendrimer-type monomer is radially branched from the central atom. The dendrimer-type monomer 50 is spherical as a whole and is comprised of the dendrimer unit 50a and the polymerizable unit 50b covering the dendrimer unit 50a. The polymerable unit can bond to polymerizable unit of other dendrimer-type monomers. The diameter of the dendrimer unit 50a is preferably from about 1 to 10 nm. If the diameter of the dendrimer unit is within the range, the dendrimer-type monomer tends to be present in a liquid form, thus it is easily mixed with the liquid crystal material.

As the precursor of the polymer 40b comprised of the dendrimer-type structure 501 and the non-dendrimer-type structure 601 as shown in FIG. 3B, a liquid crystalline monomer, a liquid crystalline oligomer, a non-liquid crystalline monomer having a mesogenic group which interacts with the liquid crystal material may be used along with the dendrimer-type monomer 50. Components used with the dendrimer-type monomer 50 are referred to as "non-dendrimer-type monomer". In order to obtain the polymer 40b having a repeating unit in which the dendrimer-type structure 501 and the non-dendrimer-type structure 601 are bonded at a ratio of 1:1 as shown in FIG. 3B, the dendrimer-type monomer 50 and the non-dendrimer-type monomer (at a molar ratio of 1:1) are used with the polymerization initiator 40c.

If the liquid crystal layer 30 containing the precursor 40d and the polymerization initiator 40c as shown in FIG. 2C is irradiated with light or heated, the precursors 40d are polymerized by the polymerization initiator 40c to form a polymer 40b. The three-dimensional structure formed by plurality of the liquid crystal molecule cylinders 40a is maintained by the polymer 40b.

Before polymerization, the precursors 40d are located in the spaces among a plurality of the liquid crystal molecule cylinders 40a. If the precursors 40d are polymerized, the polymer 40b is formed in the space between the liquid crystal molecule cylinders 40a. Thus, the polymer 40b serves as a template and the arrangement of the liquid crystal molecule cylinders 40a is maintained.

The material of the dendrimer-type monomer 50 is not particularly limited as long as it is insoluble in the liquid crystal material.

Since the dendrimer-type monomer 50 has many polymerizable groups, it easily approaches another dendrimer-type monomer having a polymerizable group. Particularly, if the generation of branching in the dendrimer unit 50a is in a range of 2 to 5, the interval between polymerizable groups becomes 2 angstroms which is smaller than a distance where the van der Waals force acts and the polymerization is rapidly progressed. Thus, less of the unpolymerized dendrimer-type monomer 50 may be left. Therefore, the polymer 40b is uniformly formed in the liquid crystal layer 30 and thus the arrangement of the liquid crystal molecule cylinder 40a can be maintained. If the unpolymerized dendrimer-type monomer 50 is contained in the liquid crystal layer 30, the viscosity of the liquid crystal layer 30 is increased and the response to the drive voltage may become slow. However, this can be prevented by using the dendrimer-type monomer containing the dendrimer unit with the generation of branching of 2 to 5.

On the other hand, the van der Waals force acts on non-dendrimer-type monomers and thus the monomers are not close to each other. In this case, the interval between monomers is large (3 to 6 angstroms). The probability of contact with a substance such as oxygen which inhibits the polymerization of monomer is increased. Therefore, a linear monomer is not easily polymerized, which may cause defects in polymerization.

Since the dendrimer-type monomer 50 has low shrinkage during polymerization, the lattice 40 formed by the liquid crystal molecule cylinder may be less distorted.

Thus, in the polymer 40*b* having the dendrimer-type structure 501, incomplete polymerization is hardly caused. Since the polymer 40*b* stably maintains the three-dimensional structure formed by plurality of the liquid crystal molecule cylinders 40*a*, the liquid crystal layer 30 can exhibit the blue phase stably.

<Amount of Polymers in Liquid Crystal Layer>

The amount of the polymer 40*b* contained in the liquid crystal layer 30 is desirably from 5 to 15% by mass. When the amount of the polymer 40*b* in the liquid crystal layer 30 is less than 5% by mass, a cholesteric phase may be partially formed due to a shortage of the polymer maintaining the structure which exhibits a blue phase. If the amount of the polymer 40*b* in the liquid crystal layer 30 exceeds 15% by mass, the light transmission when bright display may be decreased. Further, the movement of the liquid crystal molecules is restricted by the polymer 40*b* and thus the drive voltage for applying to the liquid crystal needs to be increased in some cases.

<Ratio of Dendrimer-Type Monomer and Non-Dendrimer-Type Monomer>

When the dendrimer-type monomer 50 and the non-dendrimer-type monomer are used together as the precursor 40*d*, the mass ratio of the dendrimer-type monomer 50 and the non-dendrimer-type monomer is desirably about 1:1. If the amount of the dendrimer-type monomer 50 is too high, it may become difficult to mix it uniformly with the liquid crystal material.

<Size of Dendrimer-Type Monomer>

The diameter of the dendrimer-type monomer 50 is desirably from about 1 to 10 nm. If the diameter is too large, namely, if the molecular weight is too high, the viscosity is increased and thus it may become difficult to mix the monomer uniformly with the liquid crystal material. If the molecular weight is low, in order to obtain the polymer 40*b* having a length which can maintain the liquid crystal molecule cylinder, it is necessary to increase the repeating number (m) for polymerizing the dendrimer-type monomer 50. The time required for the polymerization may be longer.

<Polymerizable Group>

As the polymerizable group in the polymerizable unit 50*b*, for example, an acrylic group may be used. In addition, a vinyl group having an alkyl group at the side chain, such as a methacryl group may be used.

<Example of Mesogenic Group>

Examples of the mesogenic group in the non-dendrimer-type monomer include a phenyl group, a biphenyl group, a terphenyl group, a phenyl cyclohexyl group, a biphenyl cyclohexyl group, an azobenzene group, an azoxybenzene group, a benzylideneaniline group, a stilbene group, and a tolan group.

<Example of Non-Dendrimer-Type Monomer>

Examples of the non-dendrimer-type monomer include 4,4'-bisacryloylbiphenyl, 4-acryloylbiphenyl, 4-acryloyl-4'-cyanobiphenyl, and 4-cyclohexylphenylacrylate. The mixing ratio of the liquid crystal material and the polymer is preferably determined so that the light use efficiency becomes as high as possible in a range in which the liquid crystal material has a spiral structure.

<Example of Polymerization Initiator>

As the polymerization initiator 40*c*, a polymerization initiator for polymerizing the precursor 40*d* may be used. Examples of the polymerization initiator which is commercially available and easily obtained include DAROCUR 1173 (Merk), IRGACURE 651 (Ciba-Geigy Ltd.), and IRGACURE 907 (Ciba-Geigy). The amount of the polymerization initiator is preferably 5% by mass or less based on the precursor 40*d* from the viewpoint of maintaining a high liquid crystal retention rate. If necessary, at least one selected from the group consisting of a crosslinking agent, a surfactant, a polymerization promotor, a chain transfer agent, and a photosensitizer may be used along with the polymerization initiator.

<Polymerization Method>

The precursors 40*d* are preferably polymerized by irradiation with light. The spiral space (pitch) formed by a plurality of the liquid crystal molecule cylinders 40*a* in the liquid crystal layer 30 is changed by the temperature. If the spiral space is changed, the wavelength of the light reflected on the liquid crystal layer 30 is changed. Therefore, when the precursor 40*d* is polymerized by heating, it may become difficult to control the wavelength of the light reflected on the liquid crystal layer 30.

The liquid crystal layer may be formed from a mixture containing the liquid crystal material and the precursor. A coated film is formed by applying the mixture the substrate. The precursor in the coated film can be polymerized by heating or light irradiation. It is also possible to use a solution in which the liquid crystal material and a precursor are dissolved in the solvent. The solution is applied on the substrate, and the solvent is evaporated to obtain the liquid crystal layer.

<Constitution of Other Liquid Crystal Display>

As the picture element electrode 105*a*, a transparent film, such as an ITO (indium tin oxide) thin film is used. The opposed electrode 105*b* does not require transparency, and various electrode materials such as aluminum, nickel, copper, silver, gold, and platinum may be used. The picture element electrode 105*a* may be formed on the array substrate 10 by a method such as deposition, sputtering, or photolithography.

The material of the insulating layer formed on the picture element electrode 105*a* is not particularly limited as long as it has neither reactivity nor solubility to the liquid crystal material and is electrically insulative. Known examples thereof include an organic substance such as polyimide and an inorganic substance such as silicon oxide. Methods for forming the insulating layer include known methods such as application by spin coating, and a method suitable for the material may be selected.

The thickness of the insulating layer is not particularly limited as long as it enables sufficient voltage application to the liquid crystal layer 30, but it is preferably thin within a range not impairing the insulating properties from the viewpoint of low voltage driving. Alignment treatment on the insulating layer may be appropriately performed by rubbing treatment or the like. Although the insulating layer is provided in this embodiment, a configuration not including the insulating layer is possible.

The distance between the array substrate 10 and the opposed substrate 20 is not particularly limited, and it is preferably as small as possible within a range not reducing the reflectance. This is because a low voltage drive and a higher speed response are realized.

Thus, the three-dimensional structure formed by plurality of the liquid crystal molecule cylinders 40a can be stabilized by the polymer 40b. Accordingly, it is possible to obtain a liquid crystal display which contains the liquid crystal layer 30 having a wide temperature range in which the liquid crystal material is stably present as a blue phase and less poor polymerization of the polymer 40b.

Example 1

Hereinafter, an example of the liquid crystal display will be described.

First, a MoW-comb-shaped electrode having a width of 10 μm and an interval of 10 μm was formed on a glass substrate (0.7 mm in thickness). Then, polyimide (AL-1051: Japan Synthetic Rubber Co., Ltd.) was casted on the electrode with a spinner so as to have a thickness of 70 nm to form an insulating layer, thereby obtaining the array substrate 10. Similarly, the opposed substrate 20 was obtained by forming the opposed electrode 105b on another glass substrate (0.7 mm in thickness) and forming an insulating layer on the opposed electrode 105b. An adhesive was applied to the surface of the insulating layer of the opposed substrate 20 to form a frame. A spacer having a diameter of 10 μm was disposed on the insulating layer on the array substrate. Thereafter, the array substrate 10 was attached to the opposed substrate 20 so that their insulating layers are faced, and thus the outer circumference of the space between the array substrate and the opposed substrate were sealed.

The material of the liquid crystal layer 30 was prepared as follows: 79.5 mass % of BL035 (manufactured by Merck & Co., Inc.) as the nematic phase liquid crystal, 10 mass % of ZLI-4572 (manufactured by Merck & Co., Inc.) as the chiral agent, 5 mass % of V#1000 (manufactured by Osaka Organic Chemical Industry Ltd.) as the dendrimer-type monomer, and 5 mass % of liquid crystalline monomer: 1,4-di-(4-(6-(acryloyloxy)hexyloxy-benzoyloxy-2-methylbenzene (trade name: RM257, manufactured by Merck & Co., Inc.) were mixed; 0.5 mass % of IRGACURE 651 (manufactured by Ciba-Geigy Ltd.) as the polymerization initiator, based on the dendrimer-type monomer, was added to the mixture, followed by mixing.

The molecular structure of the dendrimer-type monomer 50 (V#1000) used in Example 1 is shown in FIG. 5. The dendrimer-type monomer 50 has a spherical structure which comprises the dendrimer unit 50a and the polymerizable unit 50b bonded to the outside of the dendrmer unit 50a. In the dendrimer unit 50a, a plurality of functional groups bond to a polyester polyol. In FIG. 5, n represents an integer of 1 to 5.

The material of the liquid crystal layer 30 was injected into a space between the array substrate 10 and the opposed substrate 20. Then, the obtained structure was heated on a hot plate with controlling the temperature to exhibit a blue phase in the liquid crystal layer.

The temperature range in which the liquid crystal layer exhibited a blue phase before polymerizing the precursor 40d was from 6 to 7° C. The liquid crystal layer 30 was irradiated with ultraviolet rays using a high-pressure mercury lamp to polymerize the precursor 40d. At this time, the light having an intensity of 100 mW/cm$^2$ (365 nm) was irradiated for 1 minute.

Subsequently, a first polarizing plate was stuck to the external surface of the array substrate 10 so that the angle between the applied electric field direction and the transmission axis may be 45 degrees. A second polarizing plate was stuck to the external surface of the opposed substrate 20 in the same manner. The transmission axis of the second polarizing plate was orthogonal to that of the first polarizing plate. Then, a driver was connected to the obtained structure, thereby obtaining the liquid crystal display of Example 1. It was confirmed that the blue phase was stable in a temperature range of −30° C. to 52° C.

The voltage-transmitted light characteristics of the produced liquid crystal display 1 were evaluated using a 550-nm light at a room temperature of 25° C. The transmittance when not applying a voltage was 0.5%, while the transmittance when applying a voltage (200 Vp, 60-Hz square wave) was a maximum of 90%. Namely, the half-wavelength potential was 200 V. As for the response time, the rise time and the decay time between the minimum and maximum transmittance were less than 1 ms. The half-wave length potential and the temperature dependence of the response time were confirmed. As a result, they were almost constant in a range of 10° C. to 50° C.

The material of the liquid crystal layer 30 in Example 1, the temperature width in which the liquid crystal layer 30 before polymerizing the precursor 40d exhibits a blue phase, and the temperature range in which the polymerized blue phase is stably present are shown in Table 1. Example 2 and Comparative examples 1 and 2 described hereinafter are also shown in Table 1. When each substance is contained in the liquid crystal layer 30 before curing the polymer 40b, it is indicated by the mark "○". When each substance is not contained, it is indicated by the mark "X".

TABLE 1

|  | Example 1 | Example 2 | Comparative Example 1 | Comparative Example 2 |
|---|---|---|---|---|
| Liquid crystal | ○ | ○ | ○ | ○ |
| Chiral agent | ○ | ○ | ○ | ○ |
| Monomer 1 (low-molecular monomer) | X | X | ○ | X |
| Monomer 2 (crosslinking agent) | ○ | ○ | ○ | X |
| Monomer 3 (dendrimer) | ○ | ○ | X | ○ |
| Blue phase retaining width before polymerization | 6~7° C. | 5~6° C. | 1~2° C. | Undone |
| Polymerization: done/undone | Done | Done | Done | Undone |
| Blue phase stable temperature range | −30° C.~52° C. | −30° C.~50° C. | −30° C.~48° C. | 12° C.~23° C. |

Thus, according to Example 1, it is possible to obtain a liquid crystal display containing a liquid crystal layer having a wide temperature range in which the blue phase is stably present.

Example 2

Hereinafter, Example 2 will be described.
The liquid crystal display of Example 2 is the same as Example 1 except that the material of the liquid crystal layer 30 is different.

The material of the liquid crystal layer 30 was prepared in the following manner: 40 mass % of nematic phase liquid crystal JC1041XX (manufactured by Chisso Corporation.), 40 mass % of 5CB liquid crystal (manufactured by Aldrich), 10 mass % of ZLI-4572 (manufactured by Merck & Co., Inc.) as the chiral agent, 4.5 mass % of STAR-501 (manufactured by Osaka Organic Chemical Industry Ltd.) as the dendrimer-type monomer, and 5 mass % of RM-257 (manufactured by Merck & Co., Inc.) as the liquid crystalline monomer were mixed. Further, 0.5 mass % of polymerization initiator IRGACOURE 651 (manufactured by Ciba-Geigy Ltd.), based on the dendrimer-type monomer, was added thereto to prepare a mixture.

In STAR-501, the dendrimer-type monomer 50 comprises the dendrimer unit 50a and the polymerizable unit 50b bonded to the outside of the dendrmer unit 50a. In the dendrimer unit 50a, a plurality of functional groups bond to a dipentaerythritol. The polymerizable units 50b are acrylic groups. The molecular structure of the dendrimer-type monomer used in Example 2 is shown in FIG. 6.

The molecular structure of the liquid crystalline monomer RM-257 is shown in FIG. 7. RM-257 is a linear monomer.

The temperature range in which the liquid crystal layer exhibited the blue phase was from 5 to 6° C. The ultraviolet rays having an intensity of 50 mW/cm$^2$ (365 nm) was irradiated for 5 minutes to polymerize the precursors 40d. In this example, it was confirmed that the liquid crystal layer 30 exhibits a blue phase stably in a temperature range of −30° C. to 50° C. The voltage-transmitted light characteristics of the produced liquid crystal display were evaluated using a 550-nm light at a room temperature of 25° C. The transmittance when not applying a voltage was 0.6%, while the transmittance when applying a voltage (200 Vp, 60-Hz square wave) was a maximum of 91%. Namely, the half-wave length potential was 200 V. As for the response time, the rise time and the decay time between the minimum and maximum transmittance were less than 1 ms. The half-wave length potential and the temperature dependence of the response time were confirmed. As a result, they were almost constant in a range of 10° C. to 45° C.

Thus, according to Example 2, it is possible to obtain a liquid crystal display containing a liquid crystal layer having a wide temperature range in which the blue phase is stably present.

Comparative Example 1

The liquid crystal display of Comparative example 1 is the same as Example 1 except that the material of the liquid crystal layer 30 is different.

The material of the liquid crystal layer 30 in Comparative example 1 was prepared in the following manner: 40 mass % of nematic liquid crystal JC1041XX (manufactured by Chisso Corporation.), 40 mass % of 5CB liquid crystal (manufactured by Aldrich), 10 mass % of ZLI-4572 (manufactured by Merck & Co., Inc.) as the chiral agent, 5 mass % of RM-257 (manufactured by Merck & Co., Inc.) as the liquid crystalline polymer, and 4.5 mass % of 2-ethylhexyl acrylate (manufactured by Aldrich) were mixed. Further, 0.5 mass % of IRGACURE 651 (manufactured by Ciba-Geigy Ltd.) as the polymerization initiator (based on the liquid crystalline polymer) was added thereto, followed by mixing.

The molecular structure of 2-ethylhexyl acrylate (liquid crystalline monomer) is shown in FIG. 8. The 2-ethylhexyl acrylate is a linear molecule.

The temperature range in which the liquid crystal layer 30 exhibited a blue phase before polymerizing the precursor was from 1 to 2° C. The ultraviolet rays having an intensity of 50 mW/cm$^2$ (365 nm) was irradiated for 30 minutes to polymerize the precursors. It was confirmed that the liquid crystal layer 30 exhibits a blue phase stablly in a temperature range of −30° C. to 48° C. No heterogeneity was generated in Example 1. However, in Comparative example 1, heterogeneity was generated and it was confirmed that the cholesteric phase was partly formed. During injection of the liquid crystal mixture, volatilization of 2-ethylhexyl acrylate was observed and there was an influence of the composition gap. The curing rate was low and the influence of the unreacted monomers was partly observed.

Comparative Example 2

The liquid crystal display of Comparative example 2 is the same as Example 1 except that the material of the liquid crystal layer 30 is different.

The material of the liquid crystal layer 30 in Comparative example 2 was prepared in the following manner: 40 mass % of nematic liquid crystal JC1041XX (manufactured by Chisso Corporation.), 40 mass % of 5CB liquid crystal (manufactured by Aldrich), 10 mass % of ZLI-4572 (manufactured by Merck & Co., Inc.) as the chiral agent, and 10 mass % of liquid-crystalline dendrimer G3-6-LC1 were mixed.

The structure of the liquid-crystalline dendrimer G3-6-LC1 is shown in FIG. 9.

The mixture thus obtained was injected between the array substrate 10 and the opposed substrate 20. In this comparative example, the polymerization of precursors was not performed.

It was confirmed that the blue phase was stable in a temperature range of 12° C. to 23° C. In Comparative example 2, since the liquid crystal layer 30 does not contain a polymer, the liquid crystal layer 30 does not tend to be present as a blue phase. Accordingly, the temperature range in which the blue phase was stably present became narrower than that of Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal/polymer complex comprising:
   a liquid crystal material which exhibits a blue phase and comprises liquid crystal molecules, the liquid crystal molecules being spirally arranged to form liquid crystal molecular cylinders, an arrangement of the liquid crystal molecular cylinders being spiral;
   a polymer maintaining the arrangement and having a dendrimer-type structure comprising a dendrimer unit and a polymerizable unit bonded to an end of the dendrimer unit, the dendrimer unit comprising a central atom and at least two branched structures bonded to the central atom and having a generation of two or more, the polymerizable unit comprising a polymerizable group which can bond to a polymerizable group, the polymerizable group being bonded at least to the dendrimer unit; and a chiral agent which is presented between the liquid crystal molecules and controls an orientation of the liquid crystal molecules.

2. The liquid crystal/polymer complex according to claim 1, wherein the liquid crystal material is selected from the group consisting of a cholesteric liquid crystal and a nematic liquid crystal.

3. The liquid crystal/polymer complex according to claim 1, wherein the polymer further comprises a non-dendrimer-type structure.

4. The liquid crystal/polymer complex according to claim 3, wherein the non-dendrimer-type structure is a linear structure.

5. The liquid crystal/polymer complex according to claim 1, wherein the polymerizable group is an acrylic group.

6. The liquid crystal/polymer complex according to claim 1, wherein the dendrimer unit has a generation of 2 to 5.

7. A liquid crystal display comprising:
an array substrate;
an opposed substrate which faces the array substrate; and
a liquid crystal layer located between the array substrate and the opposed substrate, the liquid crystal layer comprising a liquid crystal/polymer complex according to claim 1.

8. The liquid crystal display according to claim 7, wherein the liquid crystal material is selected from the group consisting of a cholesteric liquid crystal and a nematic liquid crystal.

9. The liquid crystal display according to claim 7, wherein the polymer further comprises non-dendrimer-type structure.

10. The liquid crystal display according to claim 9, wherein the non-dendrimer type structure is a linear structure.

11. The liquid crystal display according to claim 7, wherein the polymerizable group is an acrylic group.

12. The liquid crystal display according to claim 7, wherein the polymer accounts for 5 to 15% by mass of the liquid crystal layer.

13. A method for manufacturing a liquid crystal/polymer complex of claim 1, the method comprising:
mixing a liquid crystal material, a dendrimer-type monomer, a chiral agent, and a polymerization initiator to obtain a mixture, the liquid crystal material exhibiting blue phase, the dendrimer-type monomer having a dendrimer-type structure comprising a dendrimer unit and a polymerizable unit bonded to an end of the dendrimer unit, the chiral agent controlling an orientation of the liquid crystal molecules;
keeping the mixture at a temperature in which the liquid crystal material exhibits a blue phase; and
polymerizing the dendrimer-type monomer to prepare a polymer.

14. The method according to claim 13, wherein the dendrimer-type monomer has a diameter of 1 to 10 nm.

15. The method according to claim 13, wherein the dendrimer-type monomer is polymerized by irradiating light.

* * * * *